US006854190B1

(12) United States Patent
Lohmann

(10) Patent No.: US 6,854,190 B1
(45) Date of Patent: Feb. 15, 2005

(54) CALCULATOR FOR OFFSET PIPE FITTING

(76) Inventor: Clarence Edwin Lohmann, 4040 NW. 62nd La., Coral Springs, FL (US) 33067

( * ) Notice: Subject to any disclaimer, the term of this patent is extended or adjusted under 35 U.S.C. 154(b) by 104 days.

(21) Appl. No.: 10/310,096

(22) Filed: Dec. 4, 2002

(51) Int. Cl.[7] ........ G01B 5/24
(52) U.S. Cl. ........ 33/1 SB; 33/412; 33/529
(58) Field of Search ........ 33/1 SB, 1 G, 33/1 BB, 15 D, 412, 529, 562, 563, 566

(56) References Cited

U.S. PATENT DOCUMENTS

| | | | | |
|---|---|---|---|---|
| 2,658,672 A | * | 11/1953 | Dalzell | 33/1 SD |
| 2,802,278 A | * | 8/1957 | Knefel | 33/562 |
| 2,899,750 A | * | 8/1959 | Becroft | 33/465 |
| 3,195,233 A | * | 7/1965 | Brocklander | 33/1 G |
| 2002/0092191 A1 | | 7/2002 | Hauzle, Jr. | |

* cited by examiner

*Primary Examiner*—Christopher W. Fulton
(74) *Attorney, Agent, or Firm*—Gold & Rizvi, P.A.; H. John Rizvi; Glenn E. Gold

(57) ABSTRACT

A special offset calculator for determining the angle of a pipe fitting. The special offset calculator includes a background sheet having an offset value table with offset values representing various offset distances between two pipes to be connected. A transparent fitting sheet has printed lines which represent center line dimensions of fittings to be used in conjunction with an ell fitting or T-fitting with unknown angle to be determined in order to make the special offset. In use, the fitting sheet is positioned on the background sheet, with designated points on both sheets aligned with each other. After the required offset distance value is found on the background sheet, the fitting sheet is rotated or pivoted until the correct fitting size on the fitting sheet matches the offset distance value on the background sheet.

20 Claims, 15 Drawing Sheets

CALCULATOR FOR OFFSET PIPE FITTING

BACKGROUND OF THE INVENTION

1. Field of the Invention

The present invention relates generally to gauges and measuring devices used to determine correct pipe fitting angles for connecting a pair of offset pipes. More particularly, the present invention relates to a calculator graph for determining the correct angles for fabrication of a pipe fitting depending on an offset distance between a pair of pipes to be connected using the fabricated pipe fitting in conjunction with an ell fitting or a T-fitting.

2. Description of the Prior Art

Pipefitters typically install and maintain piping systems for a wide variety of applications. For example, piping systems are used in the production of electricity, chemicals and computer chips, as well as in heating and cooling applications. During the course of installing and maintaining a piping system, a pipe fitter typically must connect two pipes which are disposed in different planes as occurs, for example, when a first run of pipe is to be connected to a second run of pipe that is disposed at an elevation with respect to the first run. The difference in position between the pipes is referred to as an offset.

Most pipes in a piping system are connected using standard ell fittings or T-fittings which have arms disposed at 45 or 90 degrees with respect to each other to facilitate the change in piping direction or elevation. However, because of their fixed dimensions, standard fittings will not work under circumstances in which the offset does not define a standard 45- or 90-degree angle with respect to the pipes to be connected. For example, if two pipes to be connected are 12 inches apart and two standard 90-degree ell fittings are adapted for an 18-inch connection, the standard 90-degree fittings cannot be used for the connection. In many cases, the angle between two existing pipes is other than that of a conventional elbow of 45 or 90 degrees and must be measured precisely in order to fabricate an elbow of the proper angle. It thus becomes necessary to alter a standard ell fitting in order to connect two pipes having an unconventional offset with respect to each other. This unconventional connection requirement is referred to as a special offset. Finding the correct angle for the pipe fitting required to be used in conjunction with a standard fitting or two ells of the same degree for a special offset is difficult, and use of trigonometry is essential for this determination.

Several devices are known in the art for measuring the angle between a pair of pipes intersecting each other in the same plane in order to fabricate a fitting having the desired angle for connecting the pipes. One of these is the "Pipefitters's Protractor" described in U.S. pat. appl. publication no. 2002/0092191 A1. The pipefitter's protractor is used to measure the angle between two separate pipes having an intersecting point. The protractor assembly includes a pipe attachment bar secured to the squared end of one pipe, with a protractor arm extending from the center of the pipe attachment bar and concentric with the centerline of the pipe. The protractor extends from the arm, with the arm and protractor rotating about the pipe attachment bar fitting to align the protractor plate coplanar with the plane defined by the pipes. The protractor is adjusted along the protractor arm to position the protractor origin at the intersection of the pipe centerlines, and a line is run from the origin to the center of the second pipe. The angle between the pipes and the distances from the protractor origin to the ends of each pipe are then used for fabricating an elbow to join the pipes.

SUMMARY OF THE INVENTION

The present invention is directed to a special offset calculator for determining the angle of a pipe fitting to be fabricated and used typically in conjunction with a conventional ell fitting or T-fitting or the connection of two ells of the same degree for the connection of two pipes located in different planes. The special offset calculator graph includes a background sheet having an offset value table with offset values representing various offset distances between two pipes to be connected. A degree scale is printed on the background sheet adjacent to the offset value table. A transparent fitting sheet has printed lines which represent center line dimensions of standard fittings to be altered and used in conjunction with the ell fitting or T-fitting to determine an unknown angle fitting in order to make the special offset. Preferably, both the background sheet and the fitting sheet have the same scale. Two different line configurations, one representing the use of a standard 90-degree ell fitting and an unknown angle fitting and the other representing the use of a standard T-fitting with the unknown angle fitting, are provided on the fitting sheet. In use, the fitting sheet is positioned on the background sheet, with designated points on both sheets aligned with each other. A pin is typically extended through aligned openings in the sheets at the points to facilitate pivoting the fitting sheet with respect to the background sheet. After the required offset distance value is found on the background sheet, the fitting sheet is rotated or pivoted until the correct centerline of fitting size on the fitting sheet intersects the offset distance value on the background sheet. An arrow on the fitting sheet points to a corresponding degree value on the degree scale, which degree value corresponds to the appropriate degree value for the angle of the pipe fitting to be fabricated or cut from a standard, 90-degree ell fitting.

An object of the present invention is to provide a special offset calculator that can be used to determine the angle of a fitting or fittings to be fabricated and used to connect two pipes located in different planes.

Another object of the present invention is to provide a special offset calculator which is easy to use.

Still another object of the present invention is to provide a special offset calculator which obviates the need for using trigonometry to calculate angles of pipe fittings necessary for connecting specially-offset pipes.

Yet another object of the present invention is to provide a special offset calculator which may be used to calculate the angle of an ell fitting to be fabricated and used in conjunction with a conventional ell fitting to connect two pipes located in different planes.

A further object of the present invention is to provide a special offset calculator which may used to calculate the angle of two ell fittings of the same degree to be fabricated and used in conjunction with each other.

A still further object of the present invention is to provide a special offset calculator which may be used to calculate the angle of a fitting to be fabricated and used in conjunction with a conventional T-fitting to connect two pipes located in different planes.

Another object of the present invention is to provide special offset calculator which includes a background sheet on which is printed on offset value table representing various offset distances between two pipes to be connected and a degree scale corresponding to the possible degrees of a pipe fitting of unknown degree for connecting the pipes and a transparent fitting sheet on which is printed center line dimensions of standard fittings to be fabricated and used in conjunction with the T-fitting or ell fitting, such that the fitting sheet is pivoted with respect to the background sheet to match the correct fitting size on the fitting sheet with the offset distance value on the background sheet and an arrow on the fitting sheet points to the degree value on the degree scale, which degree value corresponds to the appropriate degree value for the angle of the pipe fitting to be fabricated from a standard, 90-degree ell fitting.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

DETAILED DESCRIPTION OF THE PREFERRED EMBODIMENTS

Shown throughout the drawings, the present invention is generally directed to a special offset calculator for determining the angle of a pipe fitting to be fabricated and used typically in conjunction with a standard ell fitting, T-fitting, or two fittings of the same but unknown degree for the connection of two specially-offset pipes located in different planes. The special offset calculator includes a background sheet having an offset value table with offset values representing offset distances between two pipes to be connected. A degree scale is printed on the background sheet adjacent to the offset value table. A transparent fitting sheet has printed lines which represent center line dimensions of standard fittings to be used in conjunction with the ell fitting with unknown angle to be determined and fabricated according to the determined angle in order to make the special offset. Two different line configurations, one representing the use of a standard 90-degree ell fitting and an unknown angle fitting and the other representing the use of a standard T-fitting with the unknown angle fitting, are provided on the fitting sheet. If desired, of course, a different fitting sheet may also be utilized for two ells of unknown degree. In use, the fitting sheet is positioned on the background sheet, with designated points on both sheets aligned with each other. A pin is typically extended through aligned openings in the points to facilitate pivoting the fitting sheet with respect to the background sheet. After the required offset distance value is found on the background sheet, the fitting sheet is rotated or pivoted until the correct centerline for the fitting size on the fitting sheet intersects the offset distance value on the background sheet. An arrow on the fitting agent points to a corresponding degree value on the degree scale, which degree value corresponds to the appropriate degree value for the angle of the pipe fitting to be fabricated from a standard, 90-degree ell fitting.

Figure 1:
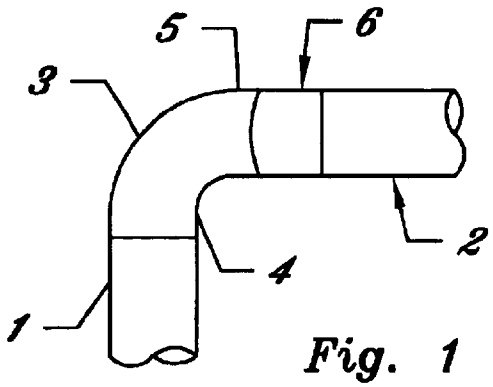
FIG. 1 is a top view of vertically-offset first and second pipes to be connected using an ell fitting in conjunction with a pipe fitting of unknown angle (in phantom) which is to be determined using the special offset calculator of the present invention.
Figure 2:
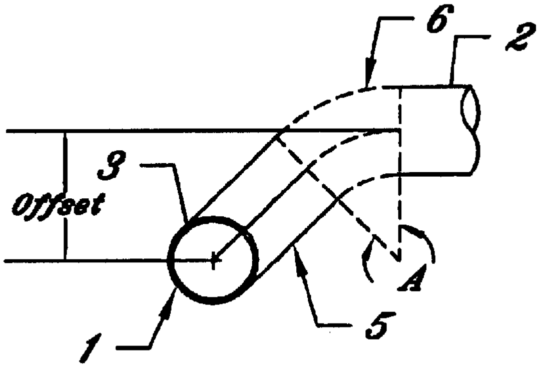
FIG. 2 is a side view of the ell fitting and pipe fitting of unknown angle (in phantom) shown in FIG. 1, with the first and second pipes disposed at a vertical offset with respect to each other and the first pipe extending from the plane of the paper and the second pipe extending along the plane of the paper.

Referring initially to FIGS. 1 and 2, in a first embodiment the special offset calculator of the present invention is capable of determining an angle "A" of a pipe fitting 6 to be fabricated from a standard ell fitting, according to the angle "A" in order to connect a first pipe 1 to a second pipe 2. As shown in FIG. 2, the first pipe 1 and second pipe 2 are disposed at a special offset with respect to each other. While the special offset shown in FIG. 2 is a vertical offset, it is understood that the present invention may be used to determine the angle "A" of a specifically-offset pipes disposed in a horizontal, vertical or any other plane. A standard, 90-degree ell fitting 3 is used in conjunction with the fabricated pipe fitting 6 of angle "A" to be determined in order to connect the first pipe 1 to the second pipe 2. The standard ell fitting 3 includes a first arm 4 and a second arm 5 which are disposed at a 90-degree angle with respect to each other. The first pipe 1 is connected to the first arm 4 of the standard ell fitting 3. The pipe fitting 6 to be fabricated according to the unknown angle "A" will be used to connect the speed pipe 2 to the second arm 5 of the ell fitting 3.

Figure 3:
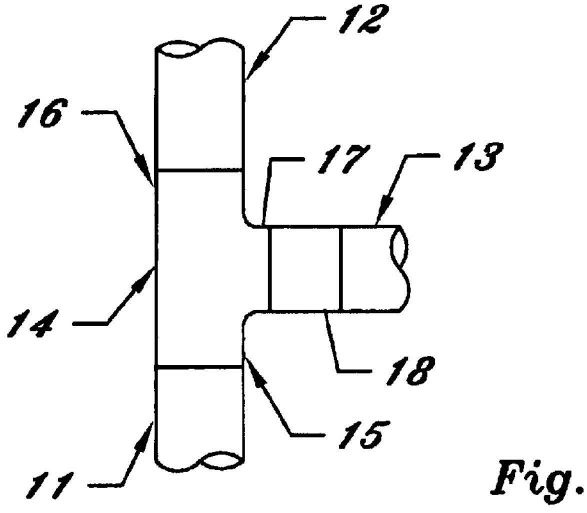
FIG. 3 is a top view of vertically-offset first and second pipes, attached to opposite arms of a T-fitting which is to be connected to a third pipe in conjunction with a pipe fitting of unknown angle (in phantom) to be determined using the special offset calculator of the present invention.
Figure 4:
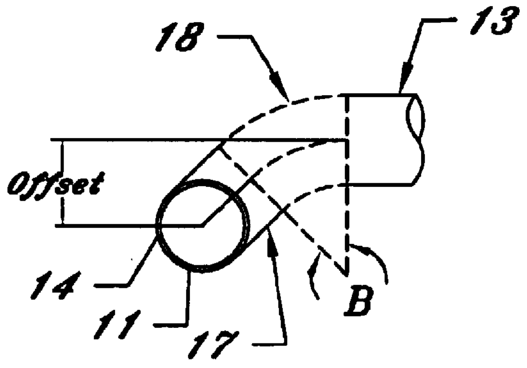
FIG. 4 is a side view of the T-fitting and pipe fitting of unknown angle (in phantom) shown in FIG. 3, with the first and third pipes disposed at a vertical offset with respect to each other and the first pipe extending from the plane of the paper and the third pipe extending along the plane of the paper.

Referring next to FIGS. 3 and 4, in a second embodiment the special offset calculator of the present invention is used to determine an angle "B" of a pipe fitting 18 to be fabricated according to the angle "B" in order to connect a standard T-fitting 14, to which is connected a first pipe 11 and a second pipe 12, to a third pipe 13. Accordingly, the first pipe 11 is connected to a first arm 15, and the second pipe 12 is connected to a second arm 16, of the standard T-fitting 14. As shown in FIG. 4, the middle or third arm 17 of the standard T-fitting 14 is disposed at a special offset with respect to the third pipe 13. While the special offset shown in FIG. 4 is a vertical offset, it is understood that the present invention may be used to determine the angle "B" of a specially-offset pipes disposed in a horizontal, vertical or any other plane. The ell fitting 18 to be fabricated according to the determined angle "B" will be used to connect the third arm 17 of the standard T-fitting 14 with the third pipe 13.

Figure 5:
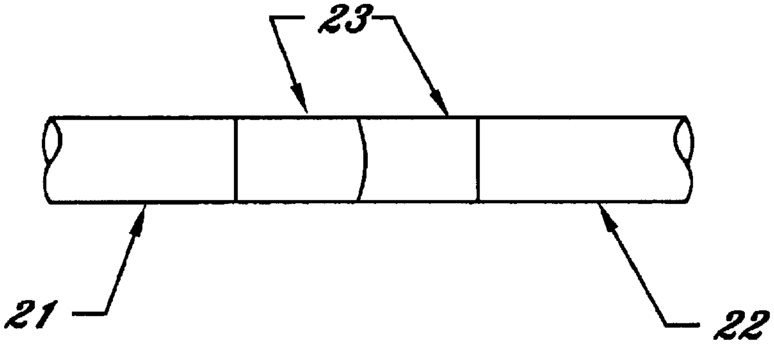
FIG. 5 is a top view of vertically-offset first and second pipes to be connected using two ell fittings of the same unknown angle (in phantom) to be determined using the special offset calculator of the present invention.
Figure 6:
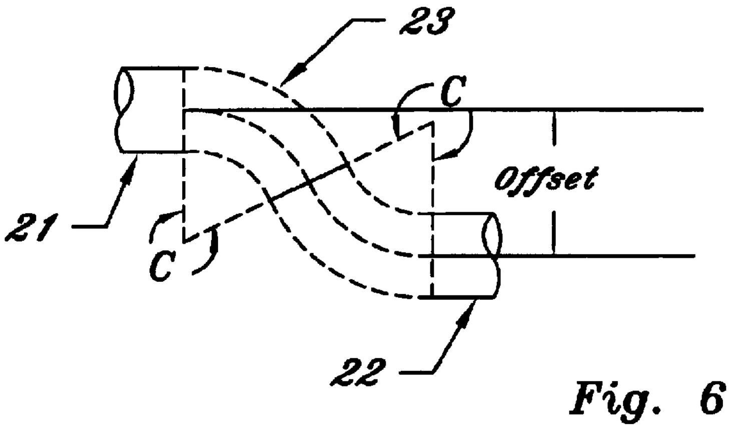
FIG. 6 is a side view of the first and second pipes and the ell fittings of unknown angle shown in FIG. 5, with the first and second pipes disposed at a vertical offset with respect to each other.

Referring next to FIGS. 5 and 6, in a third embodiment the special offset calculator of the present invention is used to determine the angle "C" of a pair of pipe fittings 23 to be fabricated according to the angle "C" in order to facilitate connecting a first pipe 21 that is specially-offset with respect to a second pipe 22. While the special offset shown in FIG. 6 is a vertical offset, it is understood that the present invention may be used to determine the angle "C" of a specially-offset pipes disposed in a horizontal, vertical or any other plane. The pipe fittings 23 to be fabricated according to the determined angle "C" will be connected to each other and used to connect the first pipe 21 with the second pipe 22.

Figure 7:
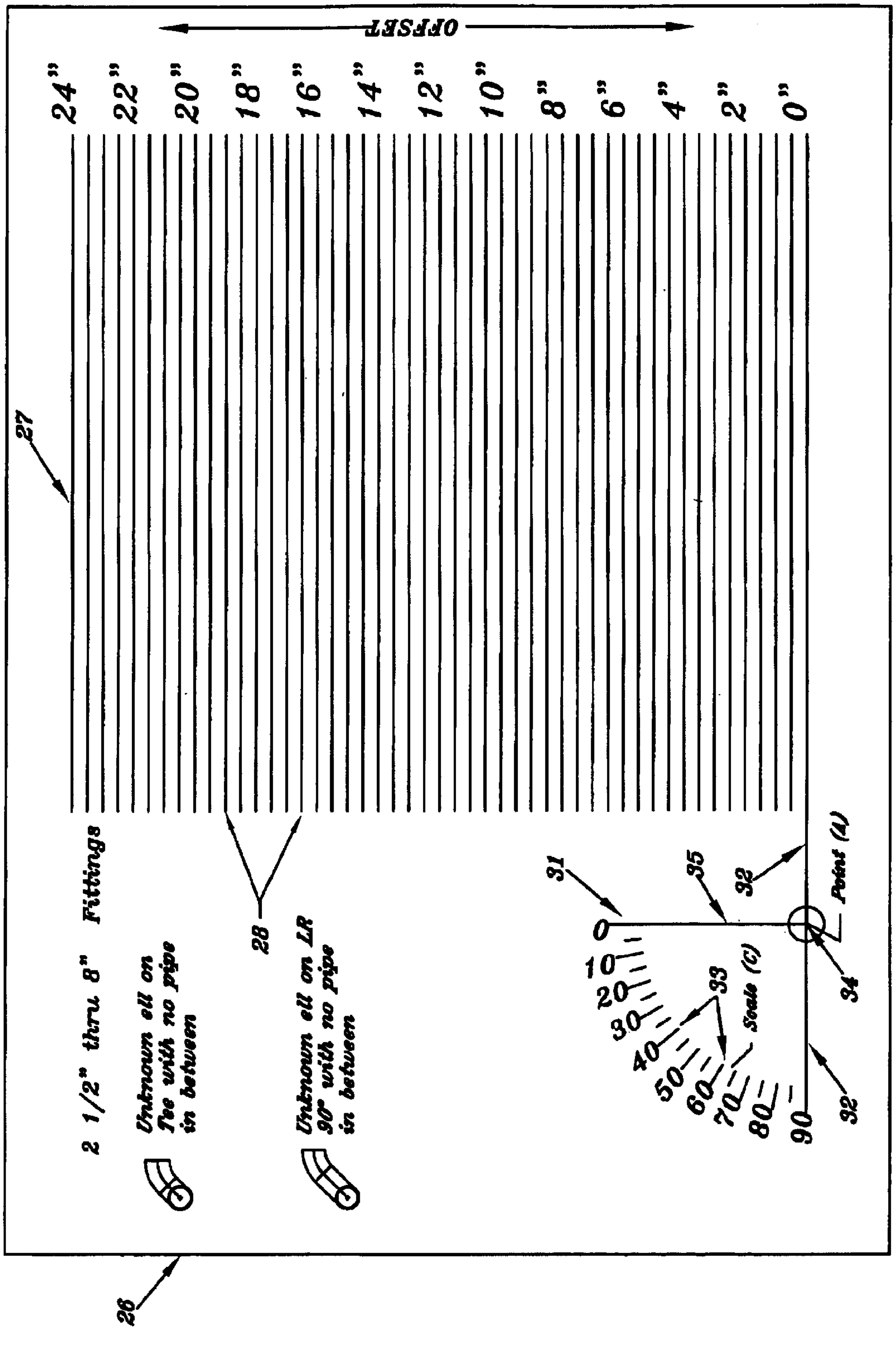
FIG. 7 is a top view of a background sheet with an offset table and degree scale for 2½"–8" diameter pipe fittings, to be used in determining an unknown angle of an ell fitting to be used with a T-fitting or ell fitting for the connection of pipes.

Referring next to FIG. 7, a first embodiment of a background sheet 26 of the present invention is shown. The background sheet 26 is designed to be used in the determination of an unknown angle for a pipe fitting to be fabricated and used in conjunction with a standard ell fitting or T-fitting to connect specially-offset pipes having diameters from 2½" to 8". An offset table 27, having multiple, parallel offset increment lines 28, is printed on the background sheet 26. Alternating ones of the offset increment lines 28 are labeled 0" through 24", inclusive. The number designations of the alternating offset increment lines 28 correspond to the offset distances between pipes to be connected using the fabricated pipe fitting the angle "A" or "B" of which is to be determined, as shown in FIGS. 1–4 and hereinafter described. A degree scale 31 adjacent to the offset table 27 includes a base line 32 which extends from the lowermost offset increment line 28, corresponding to 0", of the offset table 27. A scale line 35 is disposed in perpendicular relationship to the base line 32. A degree scale 31, having multiple degree readings 33 arranged in an arc between the base line 32 and the scale line 35, includes degree readings 33 of from 0 degrees (corresponding to the scale line 35) through 90 degrees (corresponding to the base line 32). A pivot point 34 is defined where the base line 32 meets the scale line 35.

Figure 8:
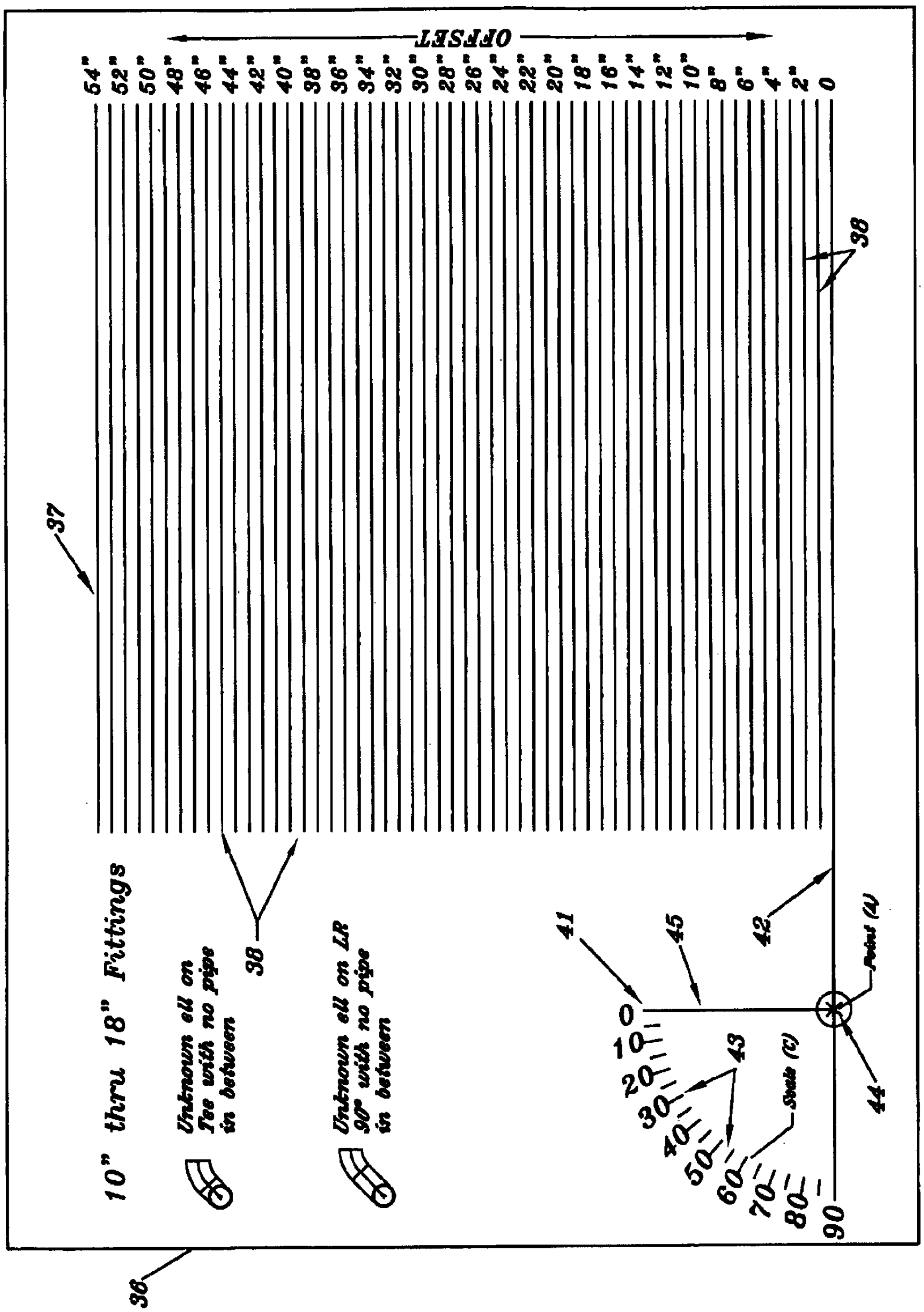
FIG. 8 is a top view of a background sheet with an offset table and degree scale for 10"–18" diameter pipe fittings, to be used in determining an unknown angle of an ell fitting to be used with a T-fitting or ell fitting for the connection of pipes.

Referring next to FIG. 8, a second embodiment of a background sheet 36 of the present invention is shown. The background sheet 36 is designed to be used in the determination of an unknown angle for a pipe fitting to be fabricated and used in conjunction with a standard ell fitting or T-fitting to connect specially-offset pipes having diameters from 10" to 18". An offset table 37, having multiple, parallel offset increment lines 38, is printed on the background sheet 36. Alternating ones of the offset increment lines 38 are labeled 0" through 54", inclusive. The number designations of the alternating offset increment lines 38 correspond to the offset distances of pipes to be connected using the fabricated pipe fitting the angle "A" or "B" of which is to be determined, as shown in FIGS. 1–4 and hereinafter described. A degree scale 41 adjacent to the offset table 37 includes a base line 42 which extends from the lowermost offset increment line 38, corresponding to 0", of the offset table 37. A scale line 45 is disposed in perpendicular relationship to the base line 42. A degree scale 41, having multiple degree readings 43 arranged in an arc between the base line 42 and the scale line 45, includes degree readings 43 of from 0 degrees (corresponding to the scale line 45) through 90 degrees (corresponding to the base line 42). A pivot point 44 is defined where the base line 42 meets the scale line 45.

Figure 9:
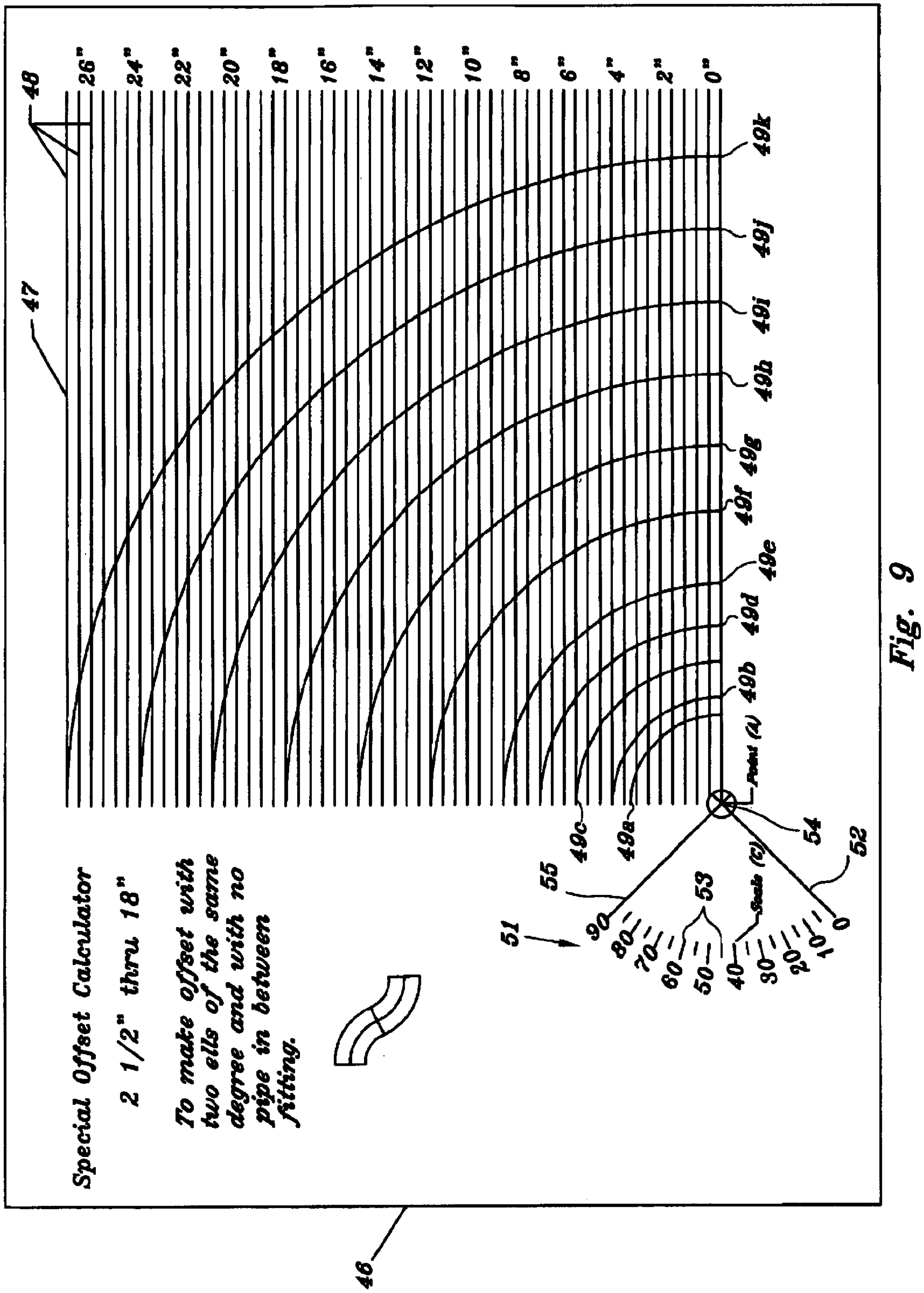
FIG. 9 is a top view of a background sheet with an offset table and degree scale for 2½"–18" diameter pipe fittings, to be used in determining the same unknown angle for a pair of ell fittings or pair of fittings of the same degree for the connection of pipes.

Referring next to FIG. 9, a third embodiment of a background sheet 46 of the present invention is shown. The background sheet 46 is designed to be used in the determination of an unknown angle for a pair of pipe fittings to be fabricated and used in conjunction with each other to connect specially-offset pipes having diameters from 2½" to 18". An offset table 47, having multiple offset increment lines 48, is printed on the background sheet 46. Alternating ones of the offset increment lines 48 are labeled 0" through 27", inclusive. The number designations of the alternating offset increment lines 48 correspond to the offset distances of pipes to be connected using the fabricated ell fittings the angle "C" of which is to be determined, as shown in FIGS. 5 and 6 and hereinafter described. A degree scale 51 adjacent to the offset table 47 includes a base line 52 which extends from the lowermost offset increment line 48 of the offset table 47, at an angle of about 45 degrees. A scale line 55 is disposed in perpendicular relationship to the base line 52. A degree scale 51, having multiple degree readings 53 arranged in an arc between the base line 52 and the vertical line 55, includes degree readings 53 of from 0 degrees (corresponding to the base line 52) through 90 degrees (corresponding to the scale line 55). A pivot point 54 is defined where the base line 52 meets the scale line 55 and the lowermost offset increment line 48. Increment arcs 49*a*–49*k*, each corresponding to standard ell fittings having diameters of 2½", 3", 4", 5", 6", 8", 10", 12", 14", 16" and 18", respectively, are provided on the offset table 47.

Figure 10:
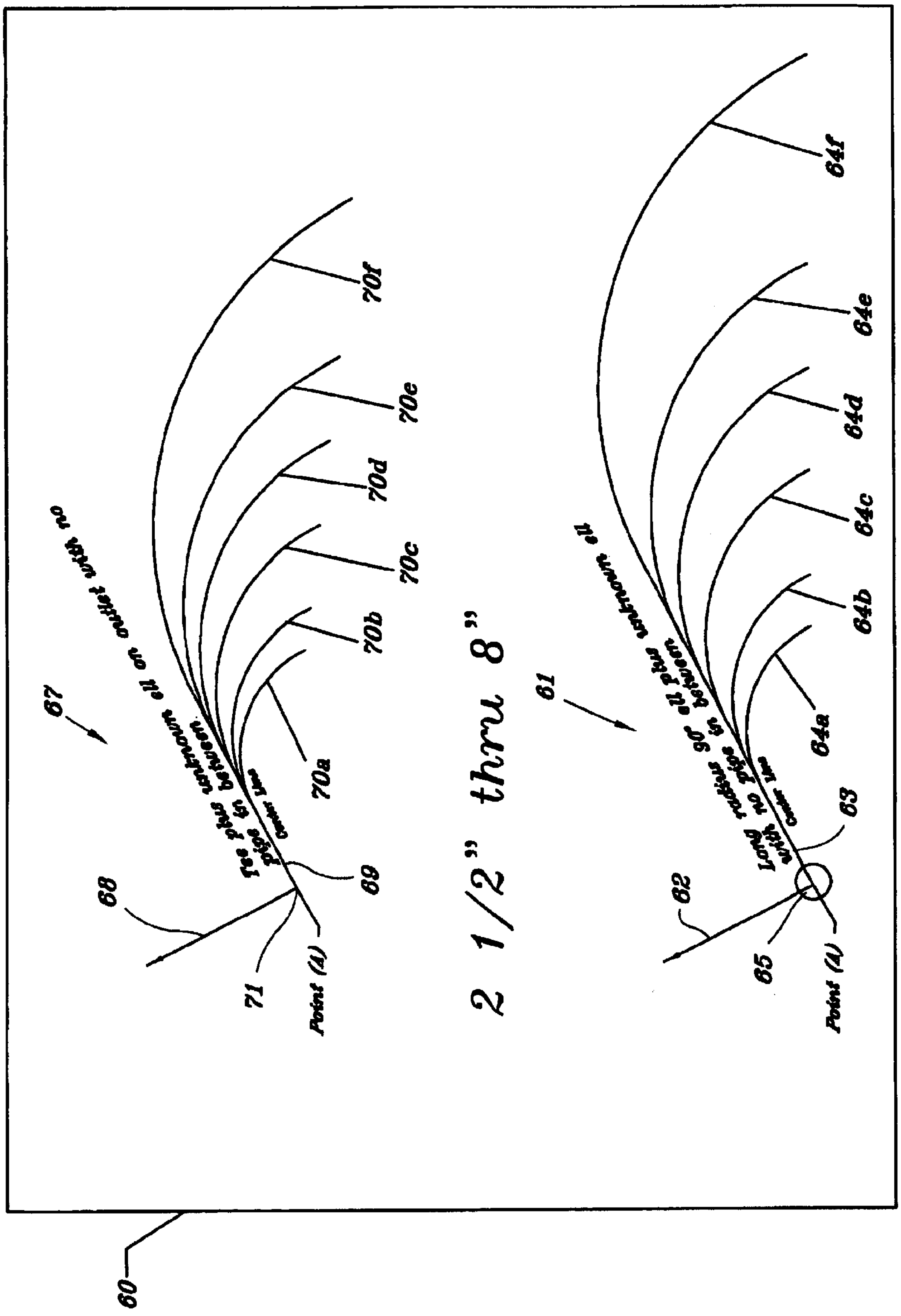
FIG. 10 is a top view of a fitting sheet for 2½"–8" pipes, to be used in conjunction with corresponding background sheet in determining an unknown angle of an ell fitting to be used with a T-fitting or ell fitting for the connection of pipes.

Referring next to FIG. 10, a first embodiment of a fitting sheet 60 of the present invention is shown. The fitting sheet 60 is adapted for use in conjunction with the background sheet 26 of FIG. 7 to determine an unknown angle for a pipe fitting to be fabricated and used in conjunction with a standard ell fitting or T-fitting in order to connect specially-offset pipes having diameters of from 2½" to 8". The fitting sheet 60 is transparent and includes an ell fitting graph 61 having a degree line 62 and a base line 63 extending from the degree line 62 at a 90-degree angle. The degree line 62 is disposed at an angle of about 60 degrees with respect to the longitudinal axis of the fitting sheet 60. Multiple center line arcs 64*a*–64*f* extend from the base line 63 in spaced-apart relationship to each other. The center line arcs 64*a*–64*f* correspond to standard 90 degree ell fittings having inside diameters of 2½", 3", 4", 5", 6" and 8", respectively. A pivot point 65 is defined where the base line 63 joins the degree line 62. A T-fitting graph 67 is further provided on the fitting sheet 60 and includes a degree line 68 and a base line 69 extending from the degree line 68 at a 90-degree angle. The degree line 68 is disposed at an angle of about 60 degrees with respect to the longitudinal axis of the fitting sheet 60. Multiple center line arcs 70*a*–70*f* extend from the base line 69 in spaced-apart relationship to each other. The center line arcs 70*a*–70*f* correspond to standard T-fittings and 90 degree ells having inside diameters of 2½", 3", 4", 5", 6" and 8", respectively. A pivot point 71 is defined where the base line 69 joins the degree line 68.

Figure 11:
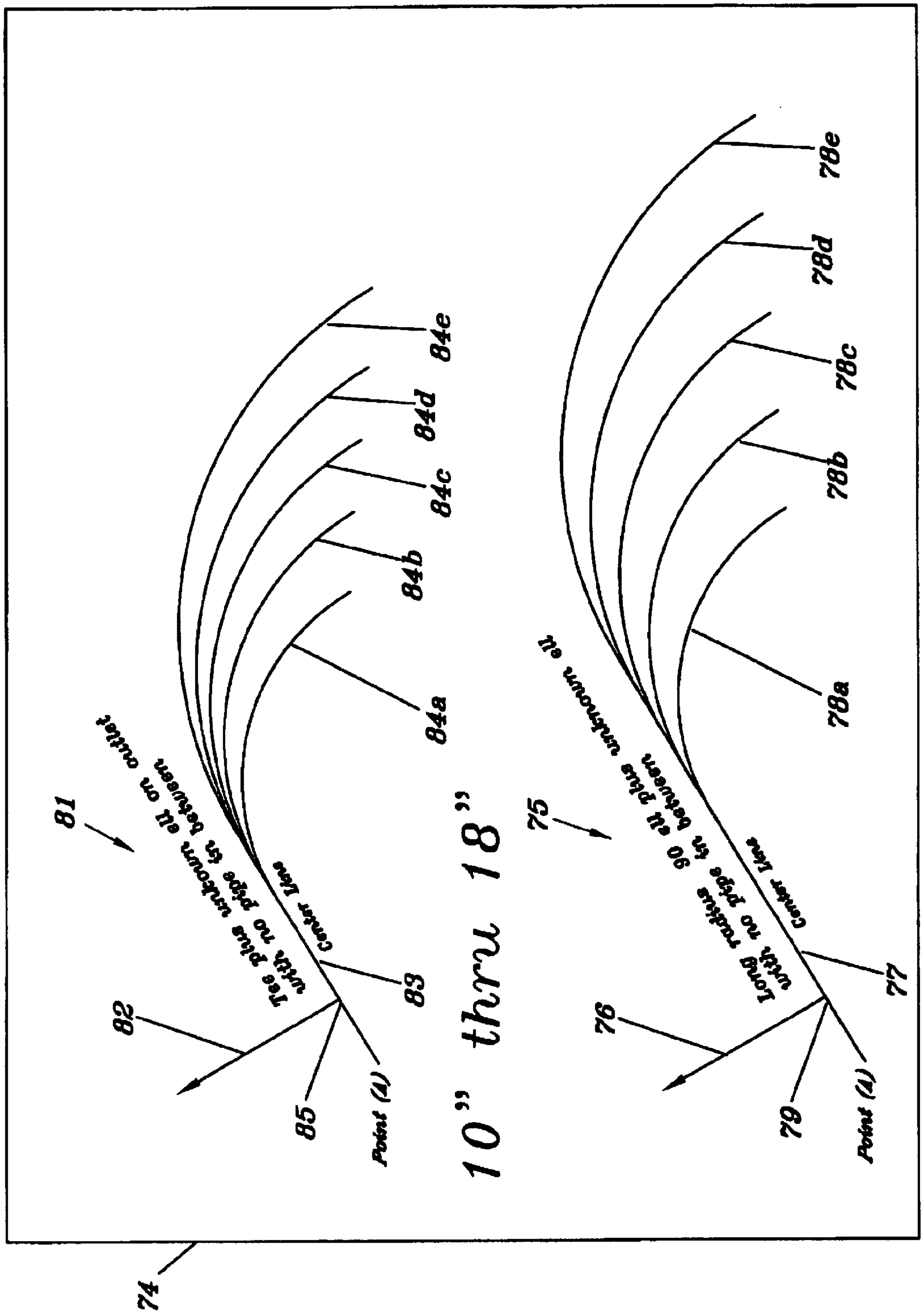
FIG. 11 is a top view of a fitting sheet for 10"–18" pipes, to be used in conjunction with the corresponding background sheet in determining an unknown angle of an ell fitting to be used with a T-fitting or ell fitting for the connection of pipes.

Referring next to FIG. 11, a second embodiment of a fitting sheet 74 of the present invention is shown. The fitting sheet 74 is adapted for use in conjunction with the background sheet 36 of FIG. 8 to determine an unknown angle for a pipe fitting to be fabricated and used in conjunction with a standard ell fitting or T-fitting in order to connect specially-offset pipes having inside diameters from 10" to 18". The fitting sheet 74 is transparent and includes an ell fitting graph 75 having a degree line 76 and a base line 77 extending from the degree line 76 at a 90-degree angle. The degree line 76 is disposed at an angle of about 60 degrees with respect to the longitudinal axis of the fitting sheet 74. Multiple center line arcs 78*a*–78*e* extend from the base line 77 in spaced-apart relationship to each other. The center line arcs 78*a*–78*e* correspond to ell fittings having inside diameters of 10", 12", 14", 16" and 18", respectively. A pivot point 79 is defined where the base line 77 joins the degree line 76. A T-fitting graph 81 is further provided on the fitting sheet 74 and includes a degree line 82 and a base line 83 extending from the degree line 82 at a 90-degree angle. The degree line 82 is disposed at an angle of about 60 degrees with respect to the longitudinal axis of the fitting sheet 74. Multiple center line arcs 84*a*–84*e* extend from the base line 83 in spaced-apart relationship to each other. The center line arcs 84*a*–84*e* correspond to standard T-fittings and 90 degree ells having diameters of 10", 12", 14", 16" and 18", respectively. A pivot point 85 is defined where the base line 83 joins the degree line 82.

Figure 12:
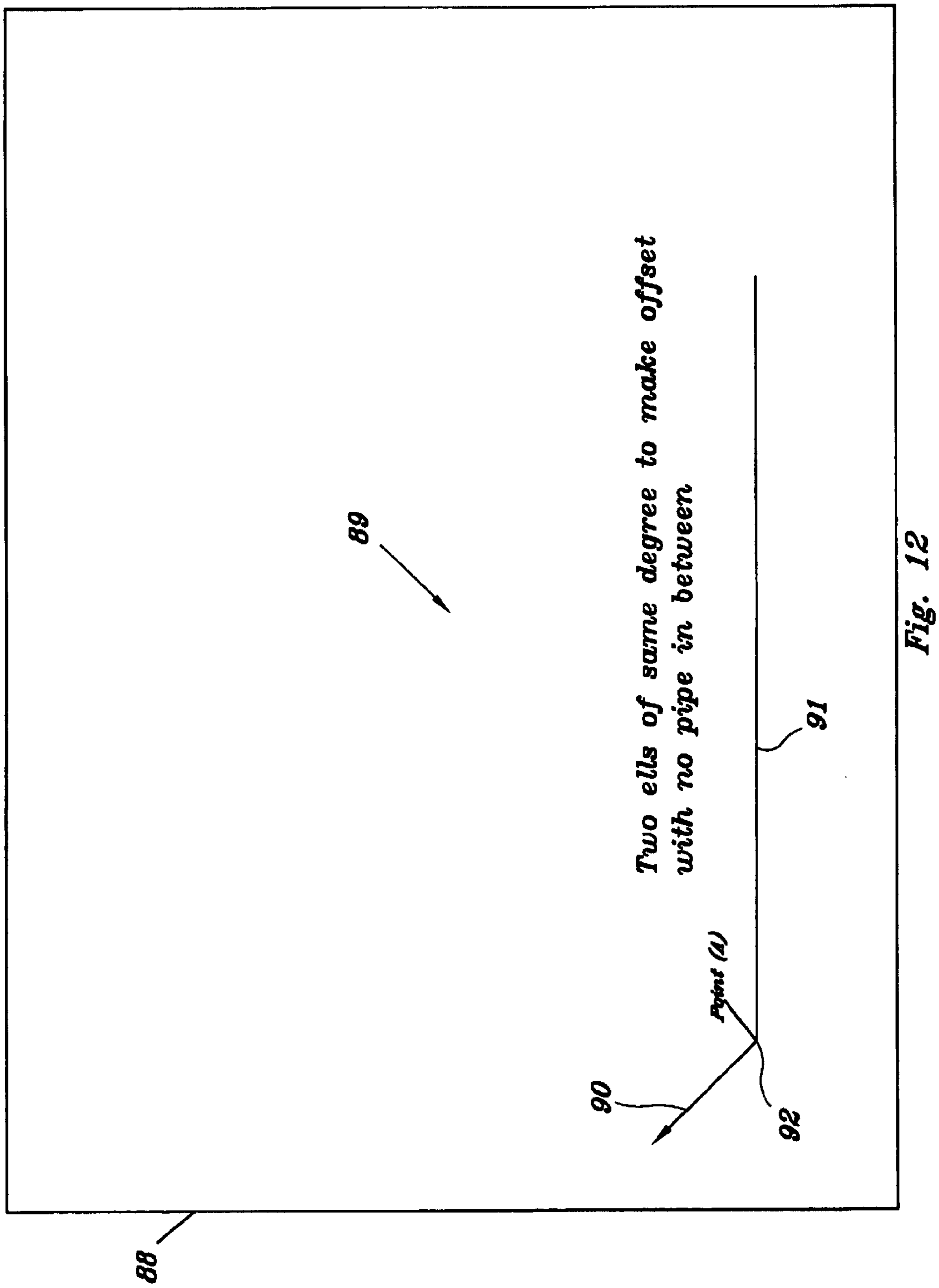
FIG. 12 is a top view of a fitting sheet for 2½"–18" pipes, to be used in conjunction with the corresponding background sheet in determining unknown angles of two fittings of the same degree for the connection of pipes.

Referring next to FIG. 12, a third embodiment of a transparent fitting sheet 88 of the present invention is used in conjunction with the background sheet 46 shown in FIG. 9, as hereinafter described, to determine an unknown angle for a pair of pipe fittings to be fabricated or cut from a standard, 90-degree ell fitting and used in conjunction with each other to connect specially-offset pipes having inside diameters from 2½" to 18". A fitting graph 89 printed on the fitting sheet 88 includes a degree line 90 which extends from a base line 91 at about a 50 degree angle. A pivot point 92 is defined where the degree line 90 joins the base line 91.

Figure 13:
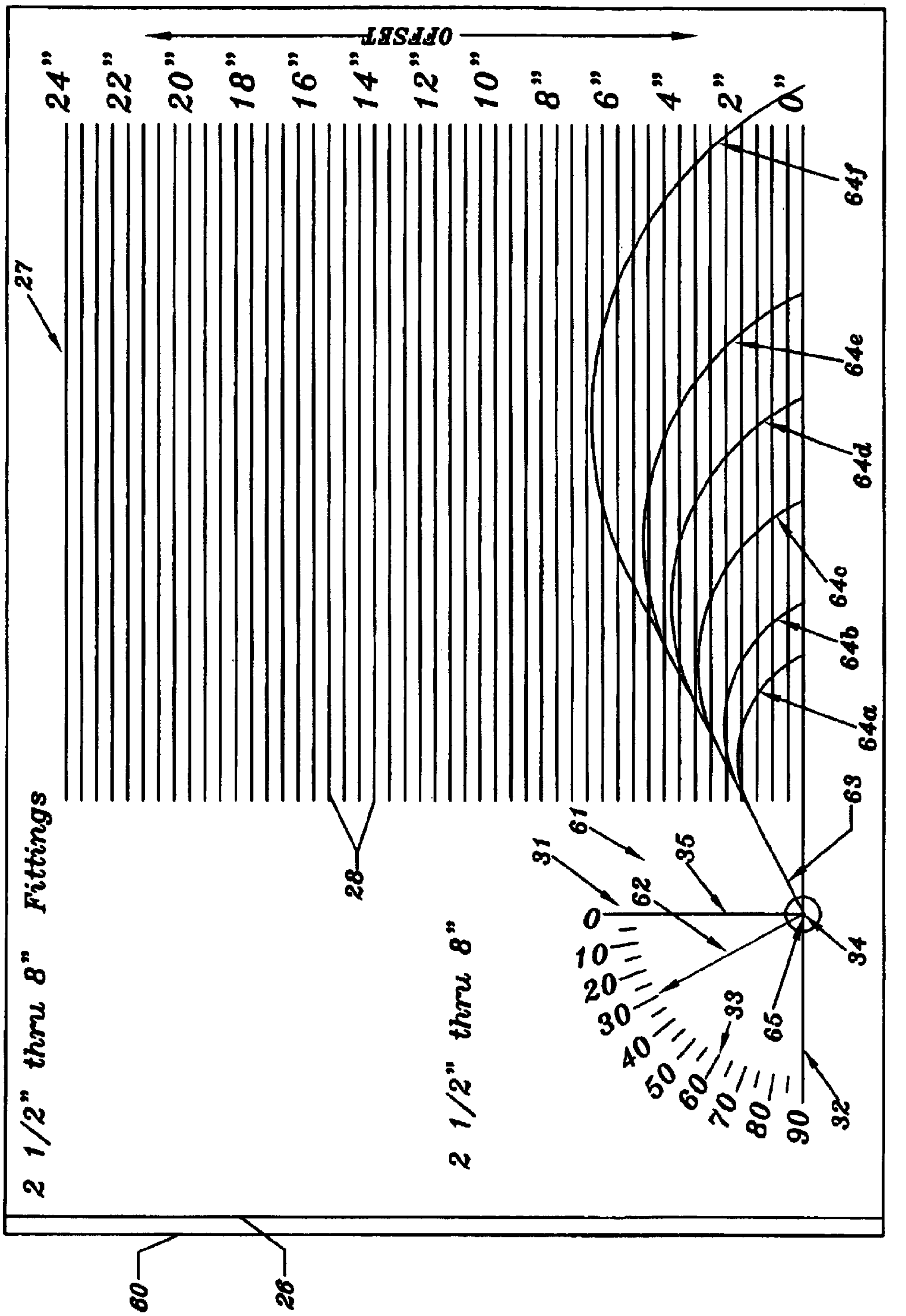
FIG. 13 illustrates use of a fitting sheet in conjunction with a background sheet in implementation of the present invention to determine the correct angle for a pipe fitting to be fabricated according to the determined angle and used in the connection of two pipes.

Referring again to FIGS. 1 and 2 and to FIG. 13, in typical application of the special offset calculator of the present invention, a pipe fitting 6 for joining a standard ell fitting 3, having a first pipe 1 connected thereto, to a second pipe 2 is fabricated as follows. First, the offset angle "A" between the first pipe 1 and the second pipe 2 must be calculated. Then, the offset angle "A" is used to fabricate or cut the pipe fitting 6 from a standard, 90-degree ell fitting. In the case of a first pipe 1 and a second pipe 2 having an inside diameter of any magnitude from 2½" to 8", the background sheet 26 (FIG. 7) for the 2½" to 8" pipe diameters is used in conjunction with the corresponding fitting sheet 60 (FIG. 10) for the 2½" to 8" pipe diameters. In the case of a first pipe 1 and a second pipe 2 having a diameter of any magnitude from 10" to 18", the background sheet 36 (FIG. 8) for the 10" to 18" pipe diameters is used in conjunction with the corresponding fitting sheet 74 (FIG. 11) for the 10" to 18" pipe diameters. Accordingly, as shown in FIG. 13, the transparent fitting sheet 60 is placed over the background sheet 26, with the pivot point 65 of the ell fitting graph 61 on the fitting sheet 60 aligned with the pivot point 34 of the underlying background sheet 26. A pin (not shown) may be extended through the aligned pivot points 65, 34. Next, the fitting sheet 60 is pivoted with respect to the underlying background sheet 26 until the apex of the appropriate center line arc 64*a*–64*f*, corresponding to the diameter of the first pipe 1 and the second pipe 2, intersects the offset increment line 28 corresponding to the offset distance between the first pipe 1 and the second pipe 2. At that point, the degree line 62 on the fitting sheet 60 points to the appropriate value for the angle "A", for example, 27 degrees, as shown, on the degree scale 31 printed on the background sheet 26 in FIG. 13. The value for the angle "A" is then used to fabricate the pipe fitting 6 from a standard ell fitting for connecting the standard ell fitting 3 to the second pipe 2 in FIG. 2. To find the angle "B" for a pipe fitting 18 to be fabricated from a standard ell fitting to connect a standard T-fitting 14 to a third pipe 13, as shown in FIGS. 3 and 4, the same procedure is undertaken using the T-fitting graph 67 (FIG. 10) instead of the ell fitting graph 61.

Figure 14:
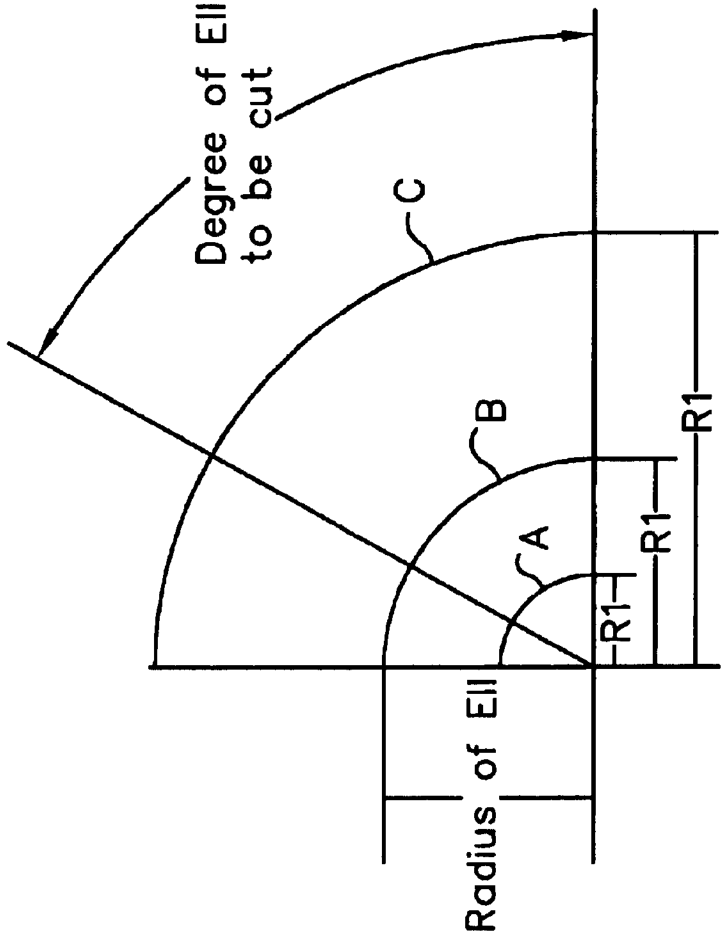
FIG. 14 is a diagram illustrating cutting or fabrication of an ell fitting using the angle determined by the method of FIG. 13.

Referring next to FIG. 14, after the value for the angle "A" or the angle "B" is calculated according to the foregoing method, the pipe fitting 6 is cut from a standard 90 degree ell fitting, according to conventional methods, such as the following. First, the dimensions of the radius R1, R2 and R3 must be found:

R1=Radius of fitting minus ½ the OD (outer diameter) of the fitting

R2=radius of fitting

R3=radius of fitting plus ½ the OD of fitting

Next, the length of the arc A, B, C must be determined:

Length of A=0.01745×degree of ell fitting to be cut×R1

Length of B=0.01745×degree of ell fitting to be cut×R2

Length of C=0.01745×degree of ell fitting to be cut×R3

Next, these dimensions are transferred onto the ell fitting to be cut. The length of A will be marked in the throat of the fitting, the length of B will be marked on the sides of the fitting, and the length of C will be marked on the back of the fitting.

Using a soapstone and a flexible straight edge, the points on the sides and the back of the fitting are connected. The fitting is turned and the points on the sides and the throat of the fitting are connected. Finally, the fitting is cut to define the pipe fitting 6 or the pipe fitting 18.

The invention will be better understood by consideration of the following examples:

EXAMPLE 1

Figure 15:
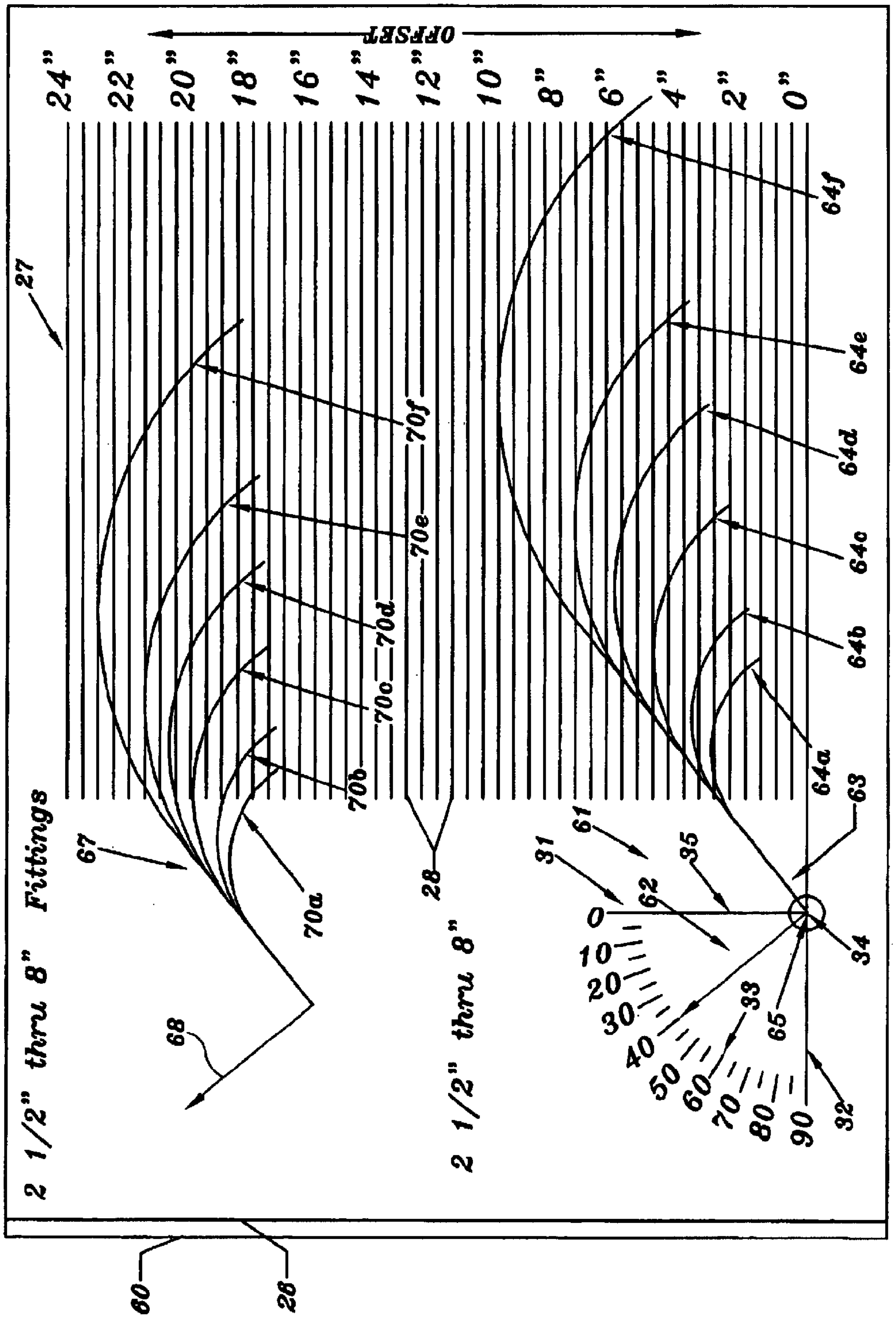
FIG. 15 illustrates use of the 2½"–8" background sheet in conjunction with the 2½"–8" fitting sheet in implementation of the present invention to determine the correct angle for an ell fitting to be fabricated according to the determined angle and used in conjunction with a standard ell fitting in the connection of two pipes.

Referring again to FIGS. 1 and 2 and to FIG. 15, a first pipe 1 having a diameter of 8" was connected to a second pipe 1, also having an inside diameter of 8", using a standard, 90-degree ell fitting 3 in conjunction with a pipe fitting 6, the offset angle "A" of which was determined as follows to fabricate or cut the pipe fitting 6 from a standard, 90-degree ell fitting. The offset distance between the first pipe 1 and the second pipe 2 was 10". First, the transparent fitting 60 for 2½" to 8" diameter pipes was placed over the background sheet 26 for 2½" to 8" diameter pipes, with the pivot point 34 of the ell fitting graph 61 on the background sheet 26 aligned with the pivot point 65 on the fitting sheet 60. A pin (not shown) was extended through the aligned pivot points 34, 65. Next, the fitting sheet 60 was pivoted with respect to the pivot points 34, 65 until the center line arc 64*f,* which corresponds to the 8" pipe diameter, intersected the offset increment line 28 on the background sheet 26 which corresponds to the 10" offset, as shown. Simultaneously, the degree line 62 on the ell fitting graph 61 pointed to the degree reading 33 on the degree scale 31 which corresponds to the appropriate degree value for the angle "A" which is, in this case, 39 degrees. Based on the calculated angle of 39 degrees, the pipe fitting 6 was then fabricated or cut from a standard 90-degree ell fitting using the procedure heretofore described with respect to FIG. 14.

EXAMPLE 2

Figure 16:
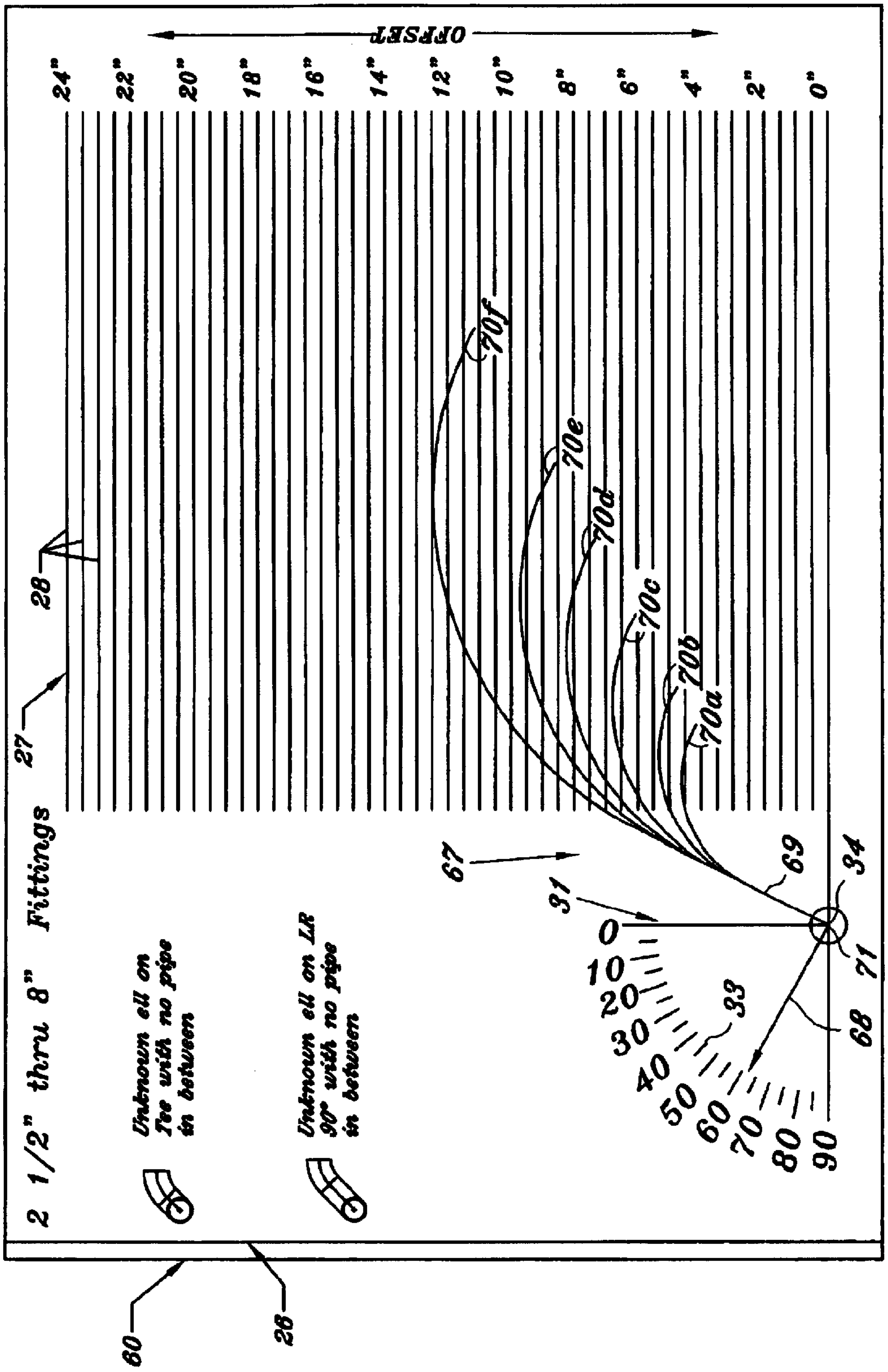
FIG. 16 illustrates use of the 2½"–8" background sheet in conjunction with the 2½"–8" fitting sheet in implementation of the present invention to determine the correct angle for an ell fitting to be fabricated according to the determined angle and used in conjunction with a standard T-fitting in the connection of two pipes.

Referring again to FIGS. 3 and 4 and to FIG. 16, a first pipe 11 and a second pipe 12, each having an inside diameter of 2½", was connected to a third pipe 13, also having an inside diameter of 2½", using a standard T-fitting 14 in conjunction with a pipe fitting 18, the offset angle "B" of which was determined as follows to fabricate or cut the pipe fitting 18 from a standard, 90-degree ell fitting. The offset distance between the first pipe 11 and the third pipe 13 was 4½". First, the transparent fitting sheet 60 for 2½" to 8" diameter pipes was placed over the background sheet 26 for 2½" to 8" diameter pipes, with the pivot point 34 of the T-fitting graph 67 on the background sheet 26 aligned with the pivot point 71 on the fitting sheet 60. A pin (not shown) was extended through the aligned pivot points 34, 71. Next, the fitting sheet 60 was pivoted with respect to the pivot points 34, 71 until the center line arc 70*a,* which corresponds to the 2½" pipe diameter, intersected the offset increment line 28 on the background sheet 26 which corresponds to the approximately 5" offset, as shown. Simultaneously, the degree line 68 on the T-fitting graph 67 pointed to the degree reading 33 on the degree scale 31 which corresponds to the appropriate degree value for the angle "B" which is, in this case, approximately 63 degrees. Based on the calculated angle of 63 degrees, the pipe fitting 18 was then fabricated or cut from a standard 90-degree ell fitting using the procedure heretofore described with respect to FIG. 14.

EXAMPLE 3

Figure 17:
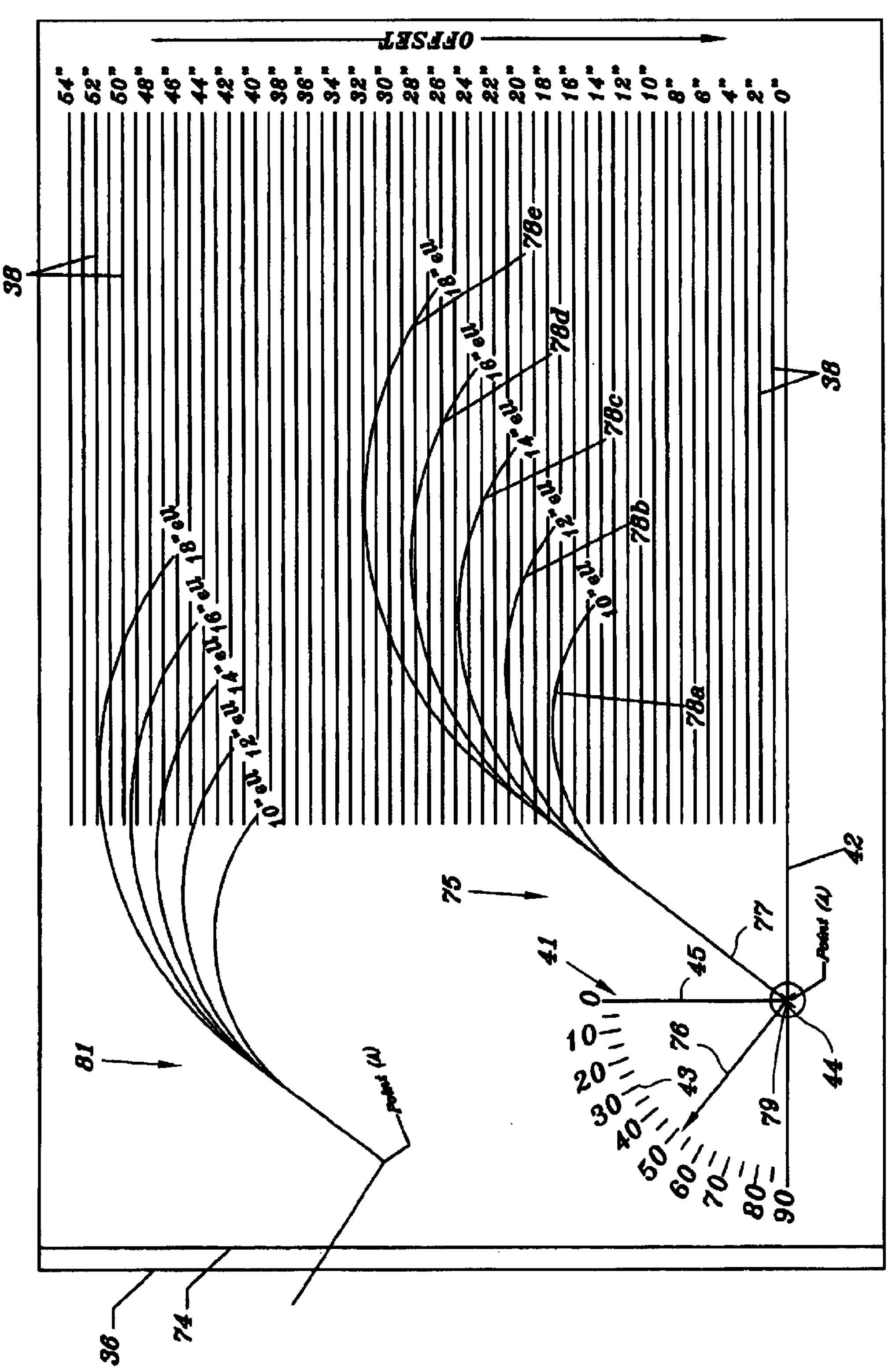
FIG. 17 illustrates use of the 10"–18" background sheet in conjunction with the 10"–18" fitting sheet in implementation of the present invention to determine the correct angle for an ell fitting to be fabricated according to the determined angle and used in conjunction with a standard ell fitting in the connection of two pipes.

Referring again to FIGS. 1 and 2 and to FIG. 17, a first pipe 1 having a diameter of 18" was connected to a second pipe 2, also having a diameter of 18", using a standard, 90-degree ell fitting 3 in conjunction with a pipe fitting 6, the offset angle "A" of which was determined as follows to fabricate or cut the pipe fitting 6 from a standard, 90-degree ell fitting. The offset distance between the first pipe 1 and the second pipe 2 was 32½". First, the transparent fitting sheet 74 for 10" to 18" diameter pipes was placed over the background sheet 36 for 10" to 18" diameter pipes, with the pivot point 44 of the ell fitting graph 75 on the background sheet 36 aligned with the pivot point 79 on the fitting sheet 74. A pin (not shown) was extended through the aligned pivot points 44, 79. Next, the fitting sheet 74 was pivoted with respect to the pivot points 44, 79 until the center line arc 78*e,* which corresponds to the 18" pipe diameter, intersected the offset increment line 38 on the background sheet 36 which corresponds to the 32½" offset, as shown. Simultaneously, the degree line 76 on the ell fitting graph 75 pointed to the degree reading 43 on the degree scale 41 which corresponds to the appropriate degree value for the angle "A" which is, in this case, approximately 53 degrees. Based on the calculated angle of approximately 53 degrees, the pipe fitting 6 was then fabricated or cut from a standard 90-degree ell fitting using the procedure heretofore described with respect to FIG. 14.

EXAMPLE 4

Figure 18:
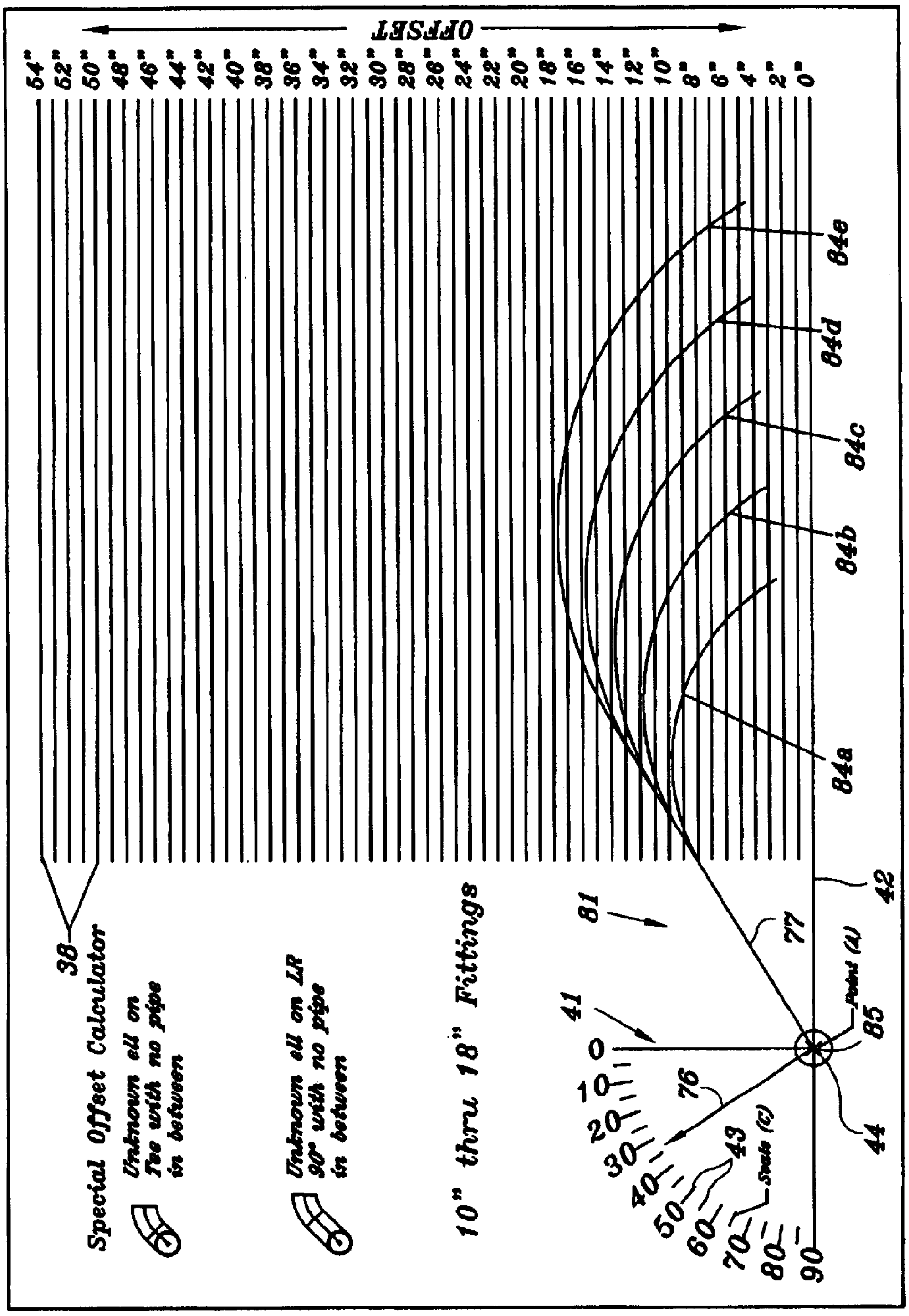
FIG. 18 illustrates use of the 10"–18" background sheet in conjunction with the 10"–18" fitting sheet in implementation of the present invention to determine the correct angle for an ell fitting to be be fabricated according to the determined angle and used in conjunction with a standard T-fitting in the connection of two pipes.

Referring again to FIGS. 3 and 4 and to FIG. 18, a first pipe 11 and a second pipe 12, each having a diameter of 10", was connected to a third pipe 13, also having a diameter of 10", using a standard T-fitting 14 in conjunction with a pipe fitting 18, the offset angle "B" of which was determined as follows to fabricate or cut the pipe fitting 18 from a standard, 90-degree ell fitting. The offset distance between the first pipe 11 and the third pipe 13 was 8½". First, the transparent fitting sheet 74 for 10" to 18" diameter pipes was placed over the background sheet 36 for 10" to 18" diameter pipes, with the pivot point 44 of the T-fitting graph 81 on the background sheet 36 aligned wit the pivot point 85 on the fitting sheet 74. A pin (not shown) was extended through the aligned pivot points 44, 85. Next, the fitting sheet 74 was pivoted with respect to the pivot points 44, 85 until the center line arc 84*a,* which corresponds to the 10" pipe diameter, intersected the offset increment line 38 on the background sheet 36 which corresponds to the 8½" offset, as shown. Simultaneously, the degree line 76 on the T-fitting graph 81 pointed to the degree reading 43 on the degree scale 41 which corresponds to the appropriate degree value for the angle "B" which is, in this case, approximately 38 degrees. Based on the calculated angle of approximately 38 degrees, the pipe fitting 18 was then fabricated or cut from a standard 90-degree ell fitting using the procedure heretofore described with respect to FIG. 14.

EXAMPLE 5

Figure 19:
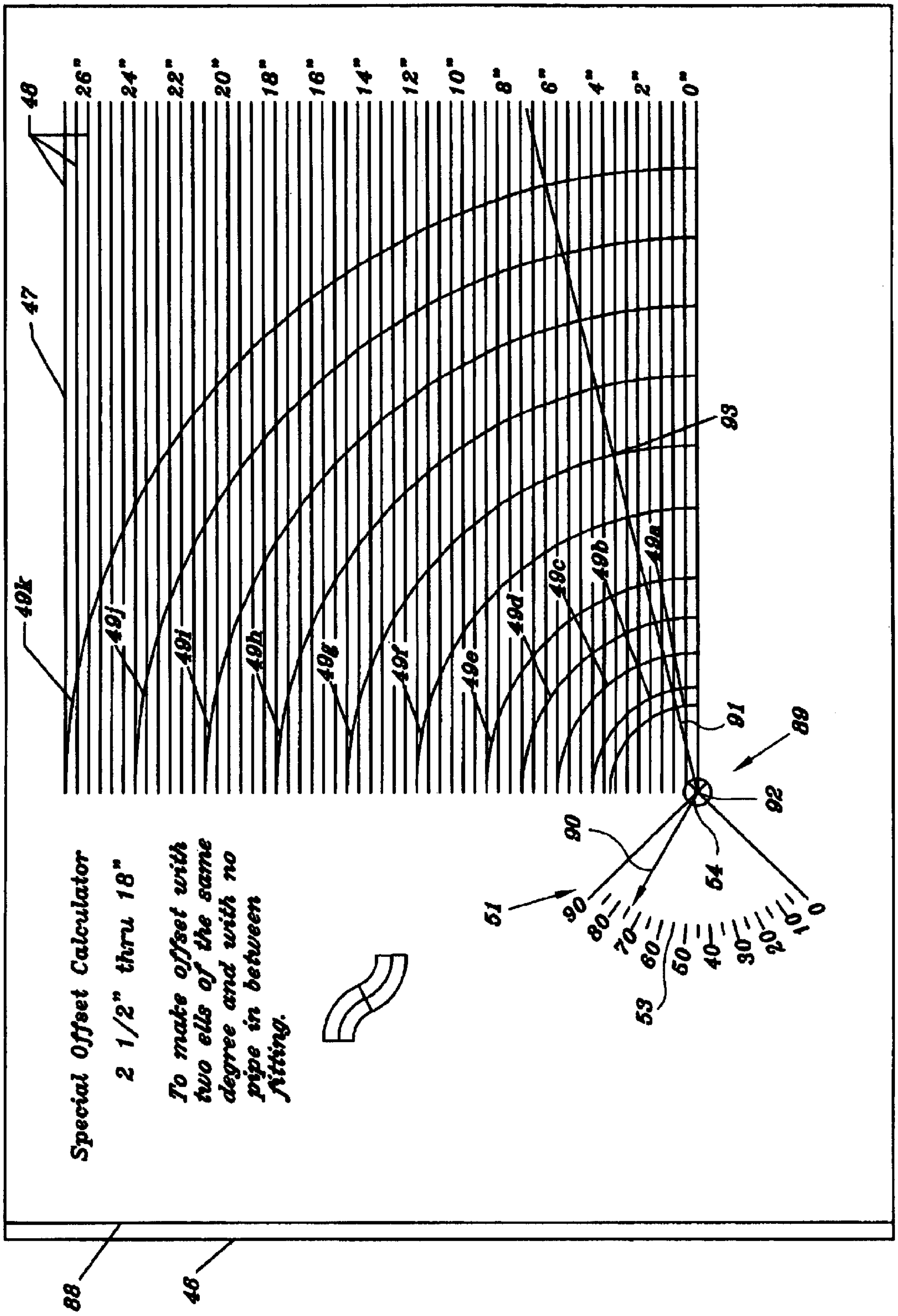
FIG. 19 illustrates the use of the 2½"–18" background sheet in conjunction with the 2½"–18" fitting sheet in implementation of the present invention to determine the correct angle for two ell fittings of the same degree to be fabricated according to the determined angle and used in the connection of two pipes.

Referring again to FIGS. 5 and 6 and again to FIG. 19, a first pipe 21 and a second pipe 22 were joined using a pair of pipe fittings 23 which were fabricated or cut from standard, 90-degree ell fittings. The offset distance between the first pipe 21 and the second pipe 22 was 4", and the diameter of each of the first pipe 21 and the second pipe 22 was 10". The offset angle "C" of the pipe fittings 23 was determined by initially placing the fitting sheet 88 on the background sheet 46, with the pivot point 92 of the fitting sheet 88 aligned with the pivot point 54 of the background sheet 46. A pin (not shown) was inserted through the fitting sheet 88 and the background sheet 46 at the pivot points 92, 54. Next, the value of ½ of the offset distance (4/2=2) was subtracted from the radius (15") of a standard 10" 90 degree ell to be connected, and the 13" offset increment line 48, corresponding to the answer, 13", was located on the offset table 47. The 13" offset increment line 48 was followed until it intersected the increment arc 49*g* which corresponds to the 10" diameter pipe on the offset table 47. Next, the fitting sheet 88 was pivoted with respect to the background sheet 46, at the pivot points 54, 92, until the base line 91 of the fitting graph 89 intersected the intersection of the increment arc 49*g* with the 13" offset increment line 48, at point 93, as shown. Simultaneously, the degree line 90 pointed to the degree reading 53 on the degree scale 51 corresponding to the degree value for the angle "C" in FIG. 8, which is, in this case, 29 degrees. Based on the calculated angle of 29 degrees, the two pipe fittings 23 were then fabricated or cut from standard 90-degree ell fittings using the procedure heretofore described with respect to FIG. 14.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

I claim:

1. A calculator for calculating an angle for a pipe fitting to connect a first pipe to a second pipe disposed at an offset distance with respect to each other, comprising:

a background sheet having printed thereon a plurality of increment lines corresponding to the offset distance between the first and second pipes, a degree scale adjacent to said increment lines, and a first pivot point; and a transparent fitting sheet having printed thereon at least one fitting graph including a degree line, a base line extending from said degree line, at least one center line arc extending from said base line and corresponding to a diameter of the pipe fitting, and a second pivot point for alignment with said first pivot point and pivoting of said fitting sheet with respect to said background sheet, wherein said center line arc intersects one of said increment lines corresponding to the offset distance and said degree line indicates the angle for the pipe fitting on said degree scale.

2. The calculator of claim 1 wherein at least one center line arc comprises a plurality of center line arcs corresponding to a plurality of possible diameters, respectively, of the first and second pipes.

3. The calculator of claim 1 wherein said at least one fitting graph comprises an ell fitting graph.

4. The calculator of claim 3 wherein at least one center line arc comprises a plurality of center line arcs corresponding to a plurality of possible diameters, respectively, of the first and second pipes.

5. The calculator of claim 1 wherein said at least one fitting graph comprises a T-fitting graph.

6. The calculator of claim 5 wherein at least one center line arc comprises a plurality of center line arcs corresponding to a plurality of possible diameters, respectively, of the first and second pipes.

7. The calculator of claim 1 wherein said at least one fitting graph comprises an ell fitting graph and a T-fitting graph.

8. The calculator of claim 7 wherein at least one center line arc of each of said ell fitting graph and said T-fitting graph comprises a plurality of center line arcs corresponding to a plurality of possible diameters, respectively, of the first and second pipes.

9. A calculator for calculating an angle for a pipe fitting to connect a first pipe to a second pipe disposed at an offset distance with respect to each other, comprising:

a background sheet having printed thereon a plurality of parallel increment lines corresponding to the offset distance between the first and second pipes, a degree scale having degree readings of from 0 to 90 degrees adjacent to said increment lines, and a first pivot point; and a transparent fitting sheet having printed thereon at least one fitting graph including a degree line, a base line extending from said degree line, a plurality of curved center line arcs extending from said base line and corresponding to possible diameters, respectively, of the pipe fitting, and a second pivot point for alignment with said first pivot point and pivoting of said fitting sheet with respect to said background sheet, wherein a selected one of said center line arcs intersects one of said increment lines corresponding to the offset distance and said degree line indicates the angle for the pipe fitting on said degree scale.

10. The calculator of claim 9 wherein said at least one fitting graph comprises an ell fitting graph and said plurality of center line arcs comprises six center lines arcs corresponding to pipe diameters of 2½", 3", 4", 5", 6" and 8", respectively.

11. The calculator of claim 9 wherein said at least one fitting graph comprises a T-fitting graph and said plurality of center line arcs comprises six center line arcs corresponding to diameters of 2½", 3", 4", 5", 6" and 8", respectively.

12. The calculator of claim 9 wherein said at least one fitting graph comprises an ell fitting graph and a T-fitting graph and said plurality of center line arcs of each of said ell fitting graph and said T-fitting graph comprises six center line arcs corresponding to diameters of 2½", 3", 4", 5", 6" and 8", respectively.

13. The calculator of claim 9 wherein said at least one fitting graph comprises an ell fitting graph and said plurality of center line arcs comprises five center line arcs corresponding to pipe diameters of 10", 12", 14", 16" and 18", respectively.

14. The calculator of claim 9 wherein said at least one fitting graph comprises a T-fitting graph and said plurality of center line arcs comprises five center line arcs corresponding to pipe diameters of 10", 12", 14", 16" and 18", respectively.

15. The calculator of claim 9 wherein said at least one fitting graph comprises an ell fitting graph and a T-fitting graph and said plurality of center line arcs of each of said ell fitting graph and said T-fitting graph comprises five center line arcs corresponding to pipe diameters of 10", 12", 14", 16" and 18", respectively.

16. A calculator for calculating an angle for a pair of pipe fittings to connect a first pipe to a second pipe disposed at an offset distance with respect to each other, comprising:

a background sheet having printed thereon a plurality of parallel increment lines corresponding to the offset distance between the first and second pipes, at least one increment arc corresponding to a diameter of the pipes and intersecting at least a portion of said increment lines, a degree scale adjacent to said increment lines, and a first pivot point; and a transparent fitting sheet having printed thereon at least one fitting graph including a degree line, a base line extending from said degree line and a second pivot point for alignment with said first pivot point and pivoting of said fitting sheet with respect to said background sheet, wherein said base line intersects at a point said at least one increment arc corresponding to the diameter of the pipes and one of said increment lines corresponding to the difference between half the offset distance and the radius of the pipes, and said degree line indicates the angle for the pipe fitting on said degree scale.

17. The calculator of claim 16 wherein said at least one increment arc comprises a plurality of increment arcs.

18. The calculator of claim 17 wherein said plurality of increment arcs comprises eleven increment arcs corresponding to pipe diameters of 2½", 3", 4", 5", 6", 8", 10", 12", 14", 16" and 18", respectively.

19. The calculator of claim 17 wherein said degree scale comprises degree readings of from 0 degrees to 90 degrees.

20. The calculator of claim 19 wherein said plurality of increment arcs comprises eleven increment arcs corresponding to pipe diameters of 2½", 3", 4", 5", 6", 8", 10", 12", 14", 16" and 18", respectively.

* * * * *